(12) United States Patent
Bisi

(10) Patent No.: US 12,383,086 B2
(45) Date of Patent: Aug. 12, 2025

(54) DISPOSABLE SHOE COVER REMOVAL MACHINE

(71) Applicant: Moacir Bisi, Caxias do Sul (BR)

(72) Inventor: Moacir Bisi, Caxias do Sul (BR)

( * ) Notice: Subject to any disclaimer, the term of this patent is extended or adjusted under 35 U.S.C. 154(b) by 0 days.

(21) Appl. No.: 18/437,618

(22) Filed: Feb. 9, 2024

(65) Prior Publication Data
US 2025/0107649 A1    Apr. 3, 2025

(30) Foreign Application Priority Data
Oct. 3, 2023    (BR) .......................... 1020230203906

(51) Int. Cl.
*A47G 25/80*    (2006.01)

(52) U.S. Cl.
CPC .................................. *A47G 25/80* (2013.01)

(58) Field of Classification Search
CPC ........ A47G 25/80; A47G 25/86; A47G 25/90; A47G 25/905; A47G 25/908
See application file for complete search history.

(56) References Cited

U.S. PATENT DOCUMENTS 8,490,842 B2 *   7/2013  Xu .......................... B65H 1/00
                                                          223/111
2011/0272440 A1  11/2011 Heller

FOREIGN PATENT DOCUMENTS

CN             113287929 A  *  8/2021  ............. A47G 25/90

* cited by examiner

*Primary Examiner* — Nathan E Durham
(74) *Attorney, Agent, or Firm* — Berg Hill Greenleaf Ruscitti LLP

(57) ABSTRACT

The present invention consists of a machine with a collector of disposable shoe covers and endowed with platform to support the foot wearing the disposable shoe cover positioned on an upper belt in a direction opposite that of the lower belt where both make up a drag mechanism of the disposable shoe covers. The machine is endowed with traction motor and driven by a switch or by an inductive sensor. The machine is endowed with steering rollers for defining the directions of the stretches of the belts which form an "L" shape. The lower belt has a mechanism comprised of an articulated roller mounted on displacers driven by springs and mounted on guides for adjusting the passage of the shoe cover inside the machine to an upper level of said belts for reaching the height of the collector where the shoe cover is collected.

5 Claims, 4 Drawing Sheets

DISPOSABLE SHOE COVER REMOVAL MACHINE

CROSS REFERENCE TO RELATED APPLICATION

This application claims the benefit of and priority to Brazilian Patent Application No. BR 1020230203906, filed Oct. 3, 2023. The entire specification and figures of the above-referenced application are hereby incorporated, in their entirety by reference.

TECHNICAL FIELD

The present invention belongs to the technological sector of mechanics and consists of a machine for removing disposable shoe covers protecting footwear, said machine being endowed with a platform for positioning the foot and equipped with a drag mechanism that removes and directs the shoe cover via a pair of belts, enabling controlled transport thereof to a disposal recipient.

BACKGROUND OF THE INVENTION

Disposable hygienic shoe covers are commonplace in the state of the art. Their purpose is to protect the environment from contaminated footwear, and to protect the footwear from contamination from the environment, used mainly in hospitals, clinics, laboratories, medical centers, clean rooms, pharmaceutical industries, electronic and cosmetic industries and many other applications where there is risk of contamination. Although these shoe covers offer a means of protecting the feet and the environment, the need to change or remove them presents the risk of contaminating the hands. This problem is particularly significant in environments where hygiene is critical.

Additionally, for people with limited mobility, such as the elderly, the obese or pregnant women, squatting or sitting down to remove the shoe covers may be uncomfortable or even unfeasible.

The equipment existing on the market to assist users of disposable shoe covers and to remove them without having to squat or sit down employ vacuum machine systems to suction the shoe covers, generating a loud noise, which may be inconvenient in environments such as hospitals or laboratories where silence is prioritized. Additionally, the use of high-speed motors that require alternating current of 110 or 220 Volts to generate vacuum may introduce the possibility of an electric shock, particularly in humid environments, where the risk of electrical conduction is greater.

The patent document US2011272440 refers to an automated device for removing shoe covers that consists of a shoe receiving chute, a vacuum system, a primary chamber and an actuator. When a user places a shoe wrapped by a cover onto the chute, the actuator is driven, activating the vacuum of the system. This causes the shoe cover to be suctioned through a vacuum-suction tubular opening, directing it to the primary chamber. The chamber, located at a remote site, collects the removed shoe covers, preventing the dispersion of dirt and contaminants into the environment. This document is designed to simplify and automate the removal of shoe covers. However, it is known that suction systems depend on the use of high-speed electric motors that present characteristics which make them inconvenient in certain types of environments such as, for example: —The noise from the electric motor and the suction system is high in relation to what is tolerable in hospital, laboratory, clinic environments etc.;

- The motors utilized in this system present the risk of electrical shock to users depending on the level of humidity in the environment and because the systems are connected directly to the power grid, without any type of source or protection between the grid and the motor;
- Electric motors generate sparks upon being activated, which prohibits the use thereof in explosive atmosphere environments;
- The system needs to use highly efficient filters to retain contaminants before the air is sent into the atmosphere.

SUMMARY OF THE INVENTION

The present invention refers to a machine that removes disposable hygienic shoe covers from the feet of users, without the need to touch with the hands, squat or sit down during the process, also eliminating devices that remove with the use of motors for suction.

The working of this device is based on a pair of belts positioned at the base of the system under a platform specially designed to house the foot wearing the hygienic shoe cover. These belts are oriented such that they move in opposite directions. When the user places his or her foot on the platform, the hygienic shoe cover rests on the belts.

This arrangement of opposite directions creates an effect of "pulling" the shoe cover into the system. Initially, this movement occurs in a low-profile area. The device incorporates its belts establishing a specific angle for dragging the insole to the top of the entry of the collector.

As the shoe cover is moved into the device by the initial belts, its trajectory is controlled by a coordinated and synchronized movement, keeping a small gap between the belts. This control enables the shoe covers to be directed by way of a continuous drag movement by these belts to an upper portion of the device, where it is conveyed and released into a recipient designated for disposal.

The movement of the belts is propelled by a motor, and can be mechanically activated by an electronic button on the safety bar or automatically by way of an inductive sensor located on the platform. When the need arises to use a pneumatic motor, it can be driven manually via the pneumatic switch on the safety bar.

Additionally, the device includes a safety bar in the upper portion, providing support for the use upon raising his or her foot to place it on the platform, preventing the person from losing balance during use, which facilitates the subsequent extraction of the hygienic shoe cover.

Advantages of the Invention

Different to the solutions existing in the state of the art, which employ noisy suction systems and high-speed motors with major power requirements, the invention is based on an extraction system given by the attrition generated by the movement of the belts in contact with the base of the disposable shoe cover worn on the user's foot. The absence of a suction motor results in lower noise emittance. Additionally, its motor operates with low-speed direct current originating from sources, eliminating the noise of the motor and any risk of electric shock in humid environments.

In environments with the risk of explosion, where safety is crucial (also known as "Explosive Atmospheres"), opting for a pneumatic motor is necessary. Said sites require devices that do not give off sparks or excessive heat, lowering the chance of igniting inflammable substances.

BRIEF DESCRIPTION OF DRAWINGS

So that the present invention is fully understood and can be put into practice by any skilled person from this technological field, it is now described clearly, precisely and fully, based on the accompanying drawings listed below.

DETAILED DESCRIPTION OF THE INVENTION

Figure 1:
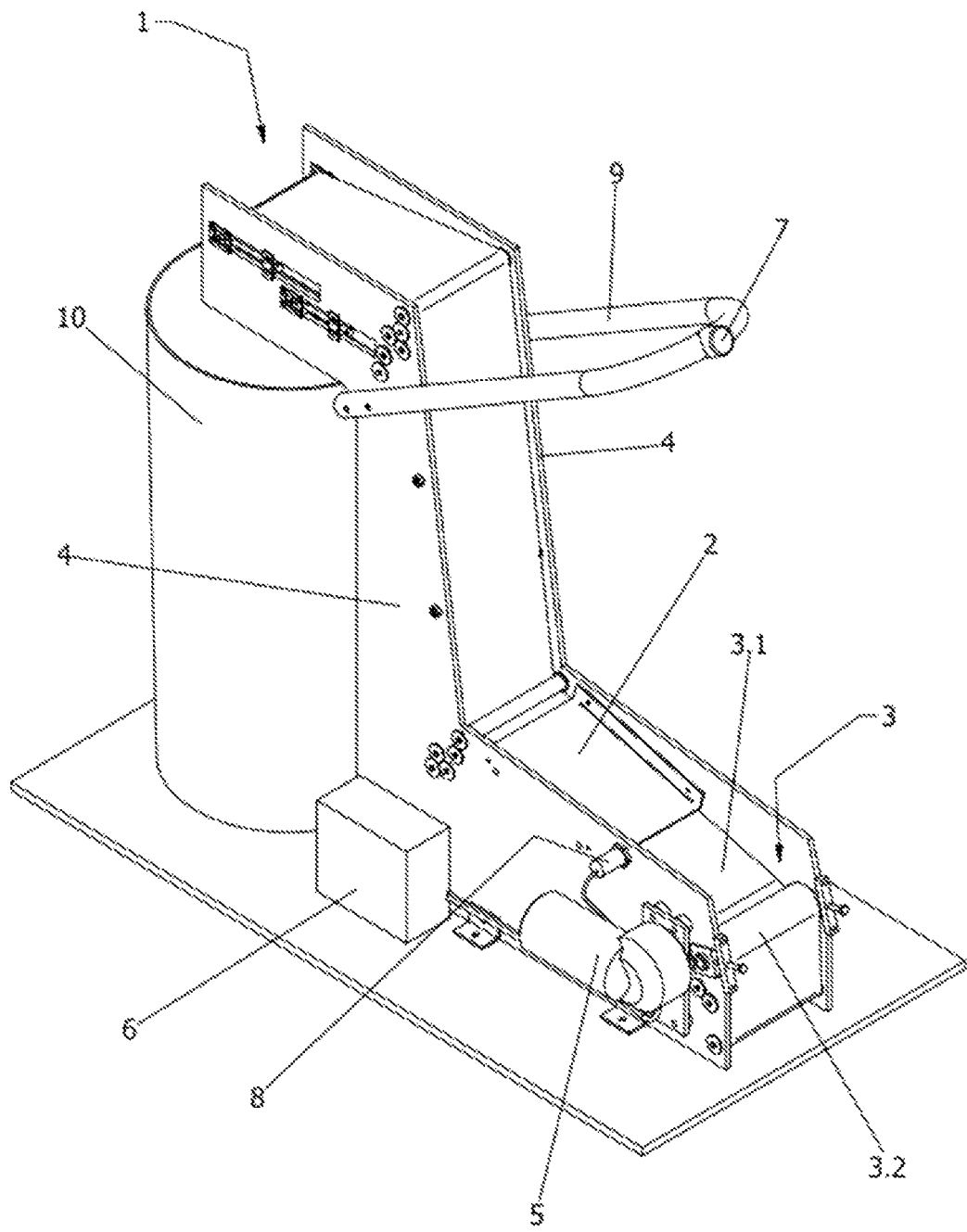
FIG. 1—Left side perspective of the device.

FIG. 1 illustrates from a left side perspective view the machine (1) with the residue collector (10) at its rear portion. The machine (1) is endowed with a platform (2) to support the foot wearing the disposable shoe cover. Said platform (2) is mounted between the structural walls (4) and positioned on the upper belt (3.1) in the direction opposite to that of the lower belt (3.2) where both make up a drag mechanism (3) of the disposable shoe covers into the machine (1).

The machine (1) is endowed with a traction motor (5) powered by a VDC source (6) and manually driven by way of a switch (7) installed on the safety bar (9) or automatically through the inductive sensor (8) located on the side of the foot support platform (2).

Figure 2:
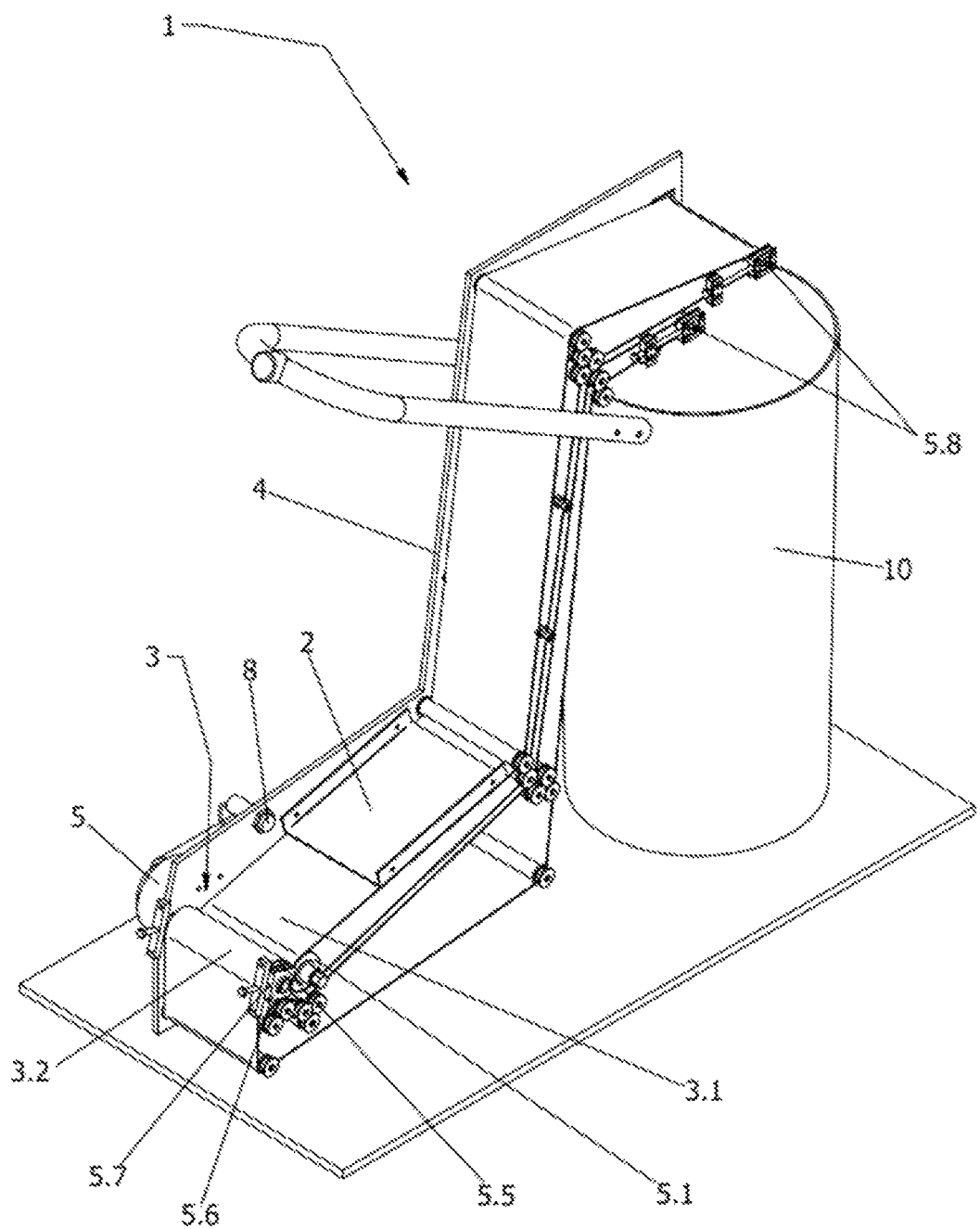
FIG. 2—Right side perspective of the device, the right structural wall being suppressed.
Figure 3:
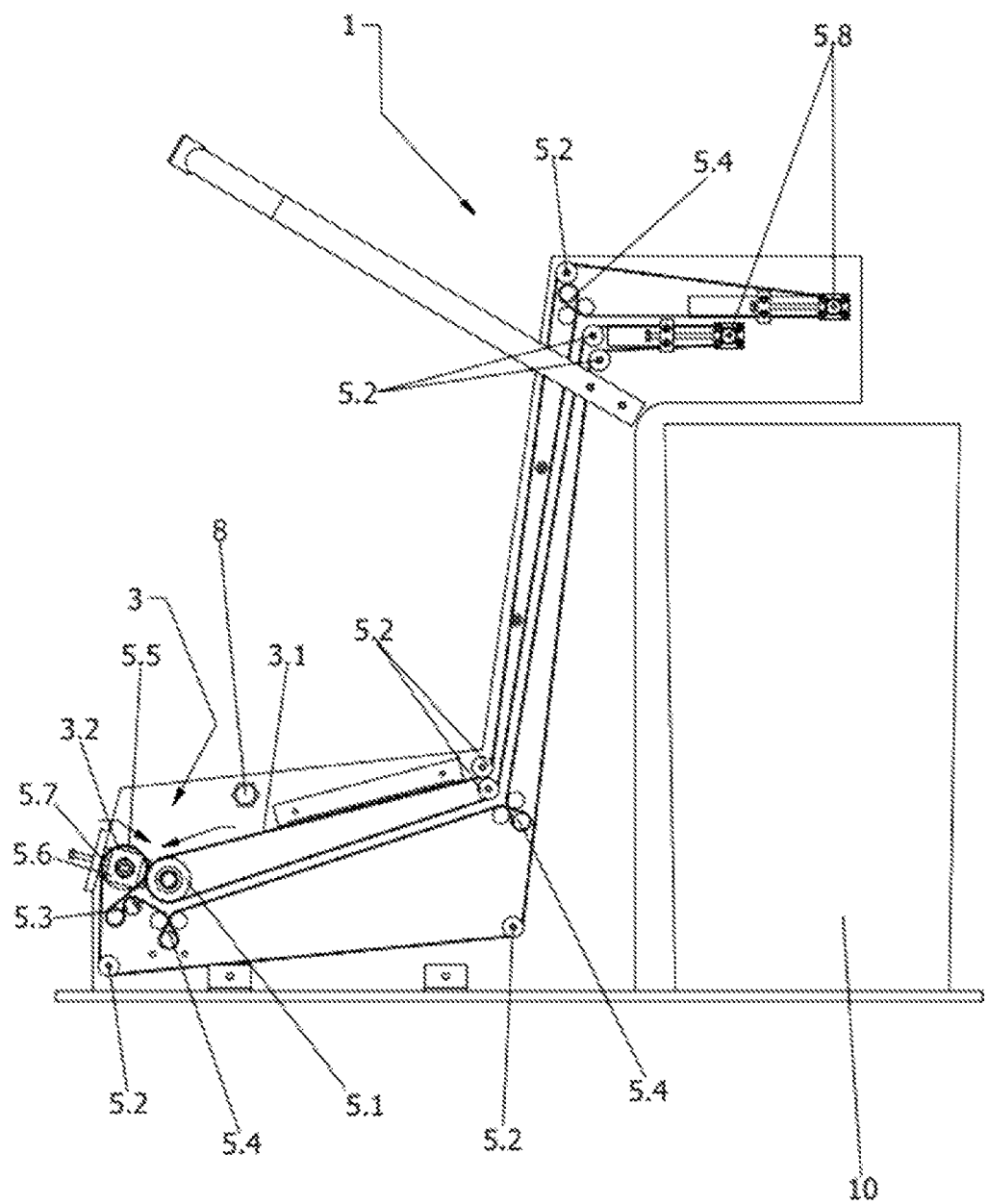
FIG. 3—Right side view, the right structural wall being suppressed.

FIGS. 2 and 3 illustrate the machine (1) with one of the structural walls (4) suppressed in order to detail the constructive arrangement employed between the steering rollers (5.2), pair of steering rollers (5.3) and trio of steering rollers (5.4) for defining the directions of the stretches of the belts which form an "L" shape, establishing a specific angle for dragging the insole up to the top of the entry of the collector. The pair of steering rollers (5.3) and the trios of steering rollers (5.4) are disposed with the aim of preventing the disposable shoe cover from being introduced between the belt and the steering roller during the passage of said shoe cover between the belts. The belts (3.1 and 3.2) are endowed with stretching rollers (5.8) at their ends located in the highest segment of the device (1) on the collector (10).

The direction of rotation of said belts (3.1) and (3.2) is indicated in FIG. 2 by direction arrows and its movement occurs by rotation of the drive cylinder (5.1) given by the traction motor (5). In these figures it is possible to see the positioning of the inductive sensor (8) on the structural wall (4) relative to the platform (2).

Figure 4:
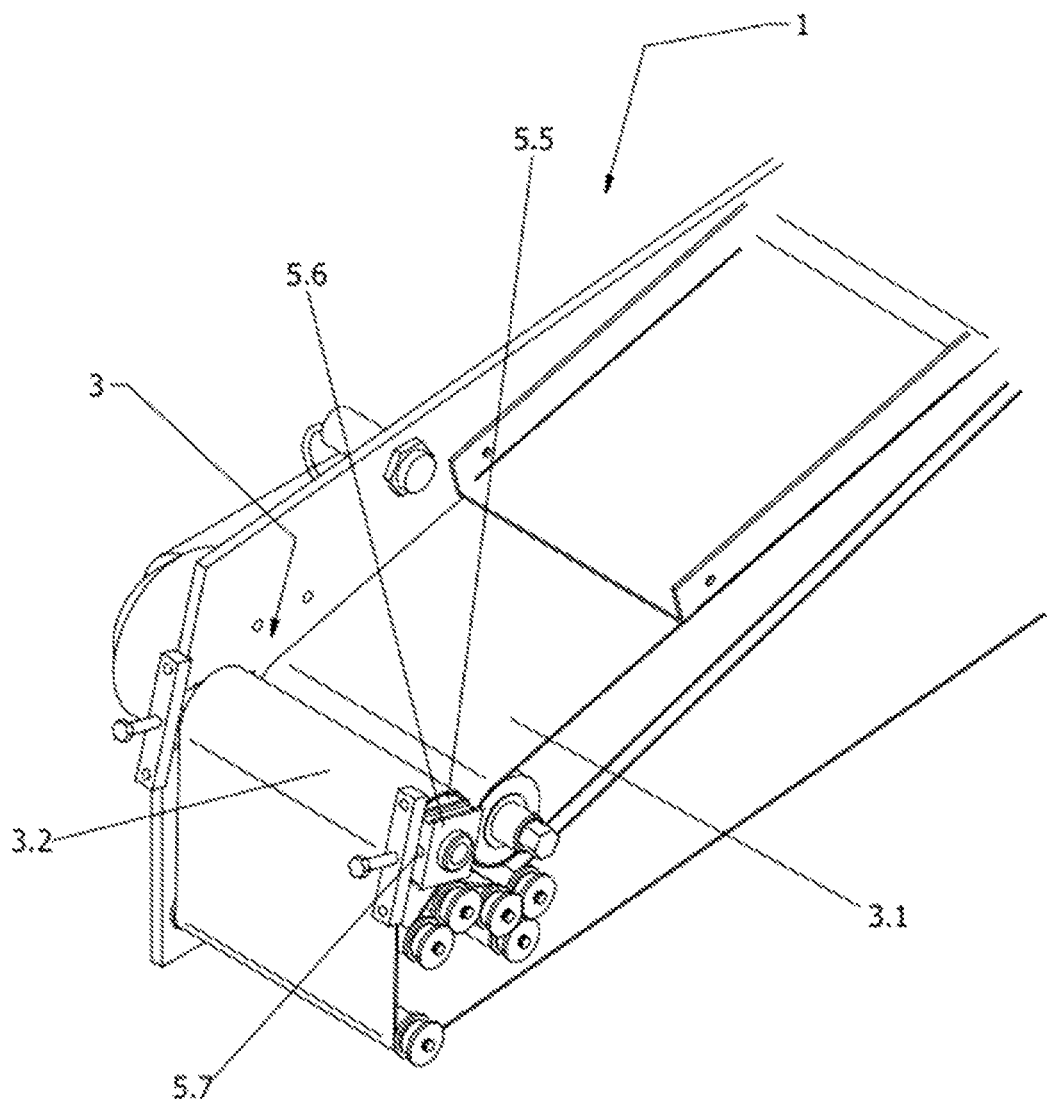
FIG. 4—Right side perspective detailing the articulation mechanism of the lower belt.

FIG. 4 is a blown-up perspective view of the drag mechanism (3) where the upper belt (3.1) and lower belt (3.2) meet to drag the shoe cover into the device (1). The lower belt (3.2) has a mechanism comprised of an articulated roller (5.5) with the ends of its axle mounted on displacers (5.6) driven by springs, said displacers (5.6) being mounted on guides (5.7). This mechanism enables the adaptive movement of the articulated cylinder (5.3) to adjust the passage of the disposable shoe cover between itself and the drive roller (5.1).

What is claimed is:

1. A disposable shoe cover removal machine comprising: a platform configured to support a foot, the platform mounted between structural walls and the machine is endowed with a recipient collector, wherein said platform is positioned on an upper belt, which moves in a direction opposite to that of a lower belt, wherein the upper and lower belts make up a drag mechanism of shoe covers in a free space between said upper and lower belts; in that the machine is endowed with a traction motor that drives a drive roller of the upper belt which by attrition drives the lower belt endowed with an articulated roller and in that the recipient collector is positioned at an upper end of the upper and lower belts.

2. The disposable shoe cover removal machine according to claim 1, wherein in that the upper belt is rotated by the drive roller and mounted on steering rollers, a trio of steering rollers and stretching rollers.

3. The disposable shoe cover removal machine according to claim 1, wherein in that the lower belt is mounted on the steering rollers, a pair of rollers, a trios of steering rollers and stretching rollers; the lower belt is endowed with the articulated roller mounted between displacers pressed by a spring with axial movement on guides.

4. The disposable shoe cover removal machine according to claim 1, wherein in that the traction motor is powered by a VDC source driven by a switch on a safety bar or by an inductive sensor located on a side of the platform.

5. The disposable shoe cover removal machine according to claim 1, wherein in that the traction motor is powered by a pneumatic circuit.

* * * * *